(12) United States Patent
Seibold

(10) Patent No.: US 6,644,744 B2
(45) Date of Patent: Nov. 11, 2003

(54) RELEASE MECHANISM FOR A SEAT

(75) Inventor: Kurt Seibold, South Lyon, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/968,269

(22) Filed: Oct. 1, 2001

(65) Prior Publication Data

US 2003/0062752 A1 Apr. 3, 2003

(51) Int. Cl.[7] .................................................. A47C 1/12
(52) U.S. Cl. ......................... 297/335; 297/336; 297/328
(58) Field of Search ................................. 297/328, 335, 297/334, 463.1; 248/408, 625; 267/157, 275, 26

(56) References Cited

U.S. PATENT DOCUMENTS

| | | | |
|---|---|---|---|
| 1,825,581 A | | 9/1931 | Comerford |
| 2,073,872 A | | 3/1937 | Kliesrath |
| 2,426,513 A | * | 8/1947 | Linn ........................... 267/275 |
| 2,633,897 A | | 4/1953 | Moore |
| 2,807,458 A | * | 9/1957 | Stephenson ................. 267/157 |
| 3,157,392 A | * | 11/1964 | Kitamura .................... 267/157 |
| 3,602,547 A | | 8/1971 | Tabor |
| 3,665,958 A | * | 5/1972 | Dunkelis .................... 137/522 |
| 3,669,399 A | * | 6/1972 | Wager ........................ 248/592 |
| 3,764,157 A | * | 10/1973 | LeBlanc .................... 280/6.154 |
| 3,926,474 A | | 12/1975 | Johndrow et al. |
| 4,047,759 A | | 9/1977 | Koscinski |
| 4,395,011 A | | 7/1983 | Torta |
| 4,431,157 A | * | 2/1984 | Arild ........................... 248/583 |
| 4,597,567 A | | 7/1986 | Racca |
| 4,616,876 A | * | 10/1986 | Suzuki et al. ................ 297/328 |
| 4,666,121 A | | 5/1987 | Choong et al. |
| 5,052,989 A | | 10/1991 | Reubeuze |
| 5,109,963 A | | 5/1992 | Husted et al. |
| 5,234,255 A | | 8/1993 | Kawakita |
| 5,308,294 A | | 5/1994 | Wittig et al. |
| 5,464,274 A | * | 11/1995 | Golynsky et al. ........... 297/328 |
| 5,553,922 A | | 9/1996 | Yamada |
| 5,634,380 A | | 6/1997 | Scholz et al. |
| 5,634,689 A | | 6/1997 | Putsch et al. |
| 5,803,546 A | * | 9/1998 | Yamazaki .................... 297/333 |
| 6,213,525 B1 | | 4/2001 | Nicola |
| 6,345,856 B1 | * | 2/2002 | Minai ....................... 296/65.03 |

FOREIGN PATENT DOCUMENTS

| EP | 0545743 | 6/1993 |
|---|---|---|
| JP | 2000038061 | 2/2000 |

OTHER PUBLICATIONS

International Search Report dated Nov. 29, 2002.

* cited by examiner

Primary Examiner—Peter M. Cuomo
Assistant Examiner—Stephanie N. Harris
(74) Attorney, Agent, or Firm—Foley & Lardner

(57) ABSTRACT

An apparatus for reducing rattle in an automotive seat release mechanism includes a torsion spring applying both a rotational force and a linear force to a cross member operatively connecting a first release and a second release. The spring force biases the cross member toward the second release linearly, and biases the cross member in a first rotational direction to reduce rattle between the cross member and components connecting the cross member to the first and second releases.

20 Claims, 2 Drawing Sheets

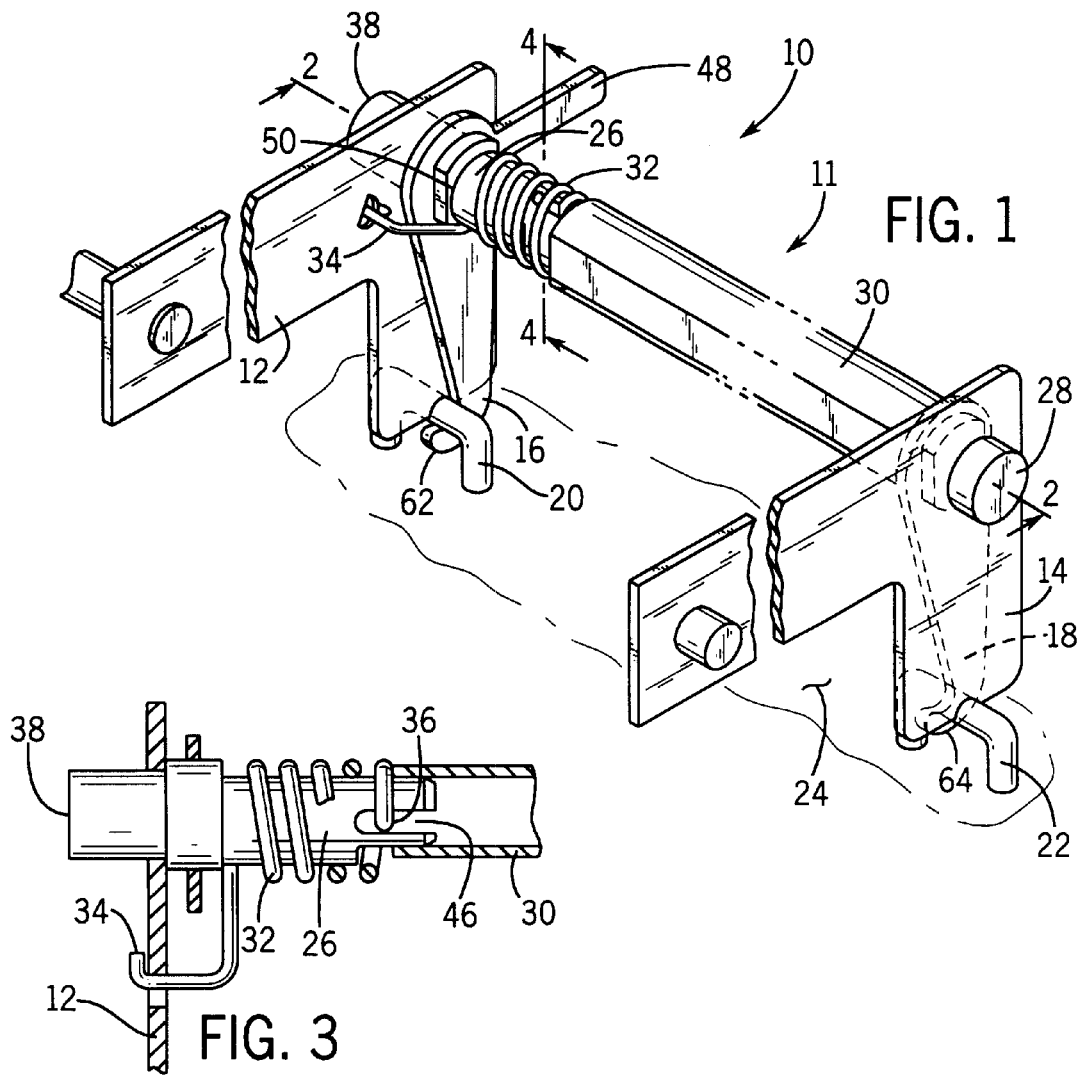
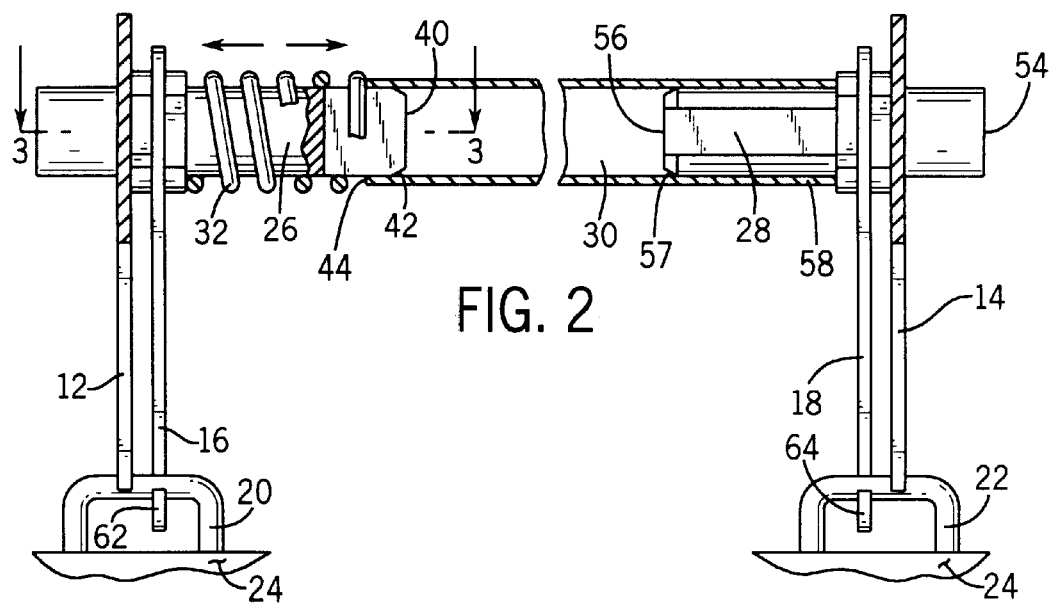

RELEASE MECHANISM FOR A SEAT

FIELD OF THE INVENTION

The present invention relates generally to the field of automotive seats and more particularly to a seat release mechanism having an anti-rattle torsion spring and cross bar.

BACKGROUND OF THE INVENTION

Seat release mechanisms for reclining the back portion of an automotive seat assembly, or for rotating or removing the automobile seat structure from the automobile floor pan are well known. An activator such as a lever or knob is located on the outside portion of the seat and is operatively connected to a release mechanism on both sides of the seat. The two release mechanisms are attached by a cable mechanism or a cross member that translates the movement of the activator from one side of the seat to the other. As a result of design clearances between the cross bar and associated components attaching the cross bar to the first and second release mechanisms there is a certain amount of play or clearance in the system. While, the clearance allows for ease of assembly, the clearance in the system also may permit the cross bar to vibrate or rattle in response to movement of the automobile. Accordingly, it would be desirable for a release mechanism to permit ease of manufacture and assembly while also eliminating any vibration or rattle in the system.

SUMMARY OF THE INVENTION

One embodiment relates to an apparatus for adjusting an automotive seat assembly. A first release is located on a first side of the seat assembly, and a second release is located on a second side of the seat assembly. A cross member operatively connects the first release and the second release. A spring applies a rotational force to the cross member about a longitudinal axis of the cross member in a first direction. The spring further applies a linear force along the longitudinal axis of the cross member and biases the cross member toward the second release.

Another embodiment relates to a method for connecting a pair of release mechanisms for a seat assembly. A first release is provided on a first side of the seat assembly and a second release is provided on a second side of the seat assembly. The first and second releases are coupled with a cross member. A spring is coupled to the cross member and provides a rotational force to the cross member about a longitudinal axis of the cross member and provides a linear force to the cross member. The cross member is biased by the spring away from the first release toward the second release.

In a further embodiment, an anti-rattle mechanism for an automotive seat release includes a cross member connecting a first and second release. A torsion spring is operatively coupled to the cross member and applies a rotational force to the cross member in a first direction, and applies a linear force to the cross member in a direction parallel to a longitudinal axis of the cross member.

BRIEF DESCRIPTION OF THE DRAWINGS

FIG. 1 is an isometric view of the release mechanism.

FIG. 2 is a partial cross sectional view of the release mechanism taken generally along lines 2—2 of FIG. 1.

FIG. 3 is a partial cross sectional view of the release mechanism taken generally along lines 3—3 of FIG. 2.

DETAILED DESCRIPTION OF THE PREFERRED EMBODIMENTS

Figure 4:
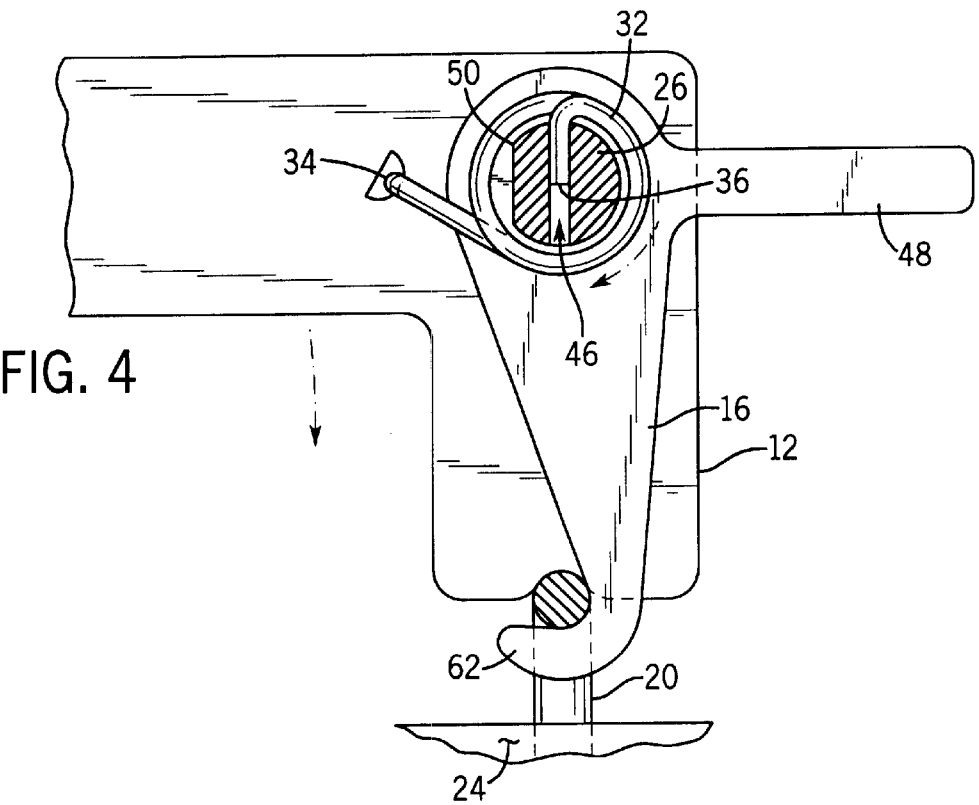
FIG. 4 is a cross sectional view of the release mechanism taken generally along lines 4—4 of FIG. 1.

Referring to FIG. 1, release mechanism 10 includes a first and second base plate or support 12, 14 secured to a respective side of a seat (not shown). A first release or activator 16 and a second release or activator 18 are releasably secured to a respective latch member 20, 22 attached to the car floor panel 24. The first and second releases 16, 18 are pivotally attached to the first and second base plates 12, 14 by a cross member 11 having a respective first and second stud, or plug or connector 26, 28. The first release 16 is operatively connected to the second release 18 by a cross tube 30. A torsion spring 32 includes a first end 34 operatively connected to the first base plate 12, and a second end 36 operatively connected to the first stud 26. As will be described below, torsion spring 32 imparts both a torsional force to the first stud and compressive force against the cross tube 30.

Referring to FIG. 2, first stud 26 extends through an opening in the first base plate 12. The opening provides a bearing surface upon which first stud 26 may rotate. First stud 26 includes a first free end 38 extending outward of the first base plate 12, and a second end 40 having a beveled portion 42 that is located within a first end 44 of cross tube 30. Second end 40 of first stud 26 includes a slot 46 for receiving the second end 36 of the spring 30.

Figure 5:
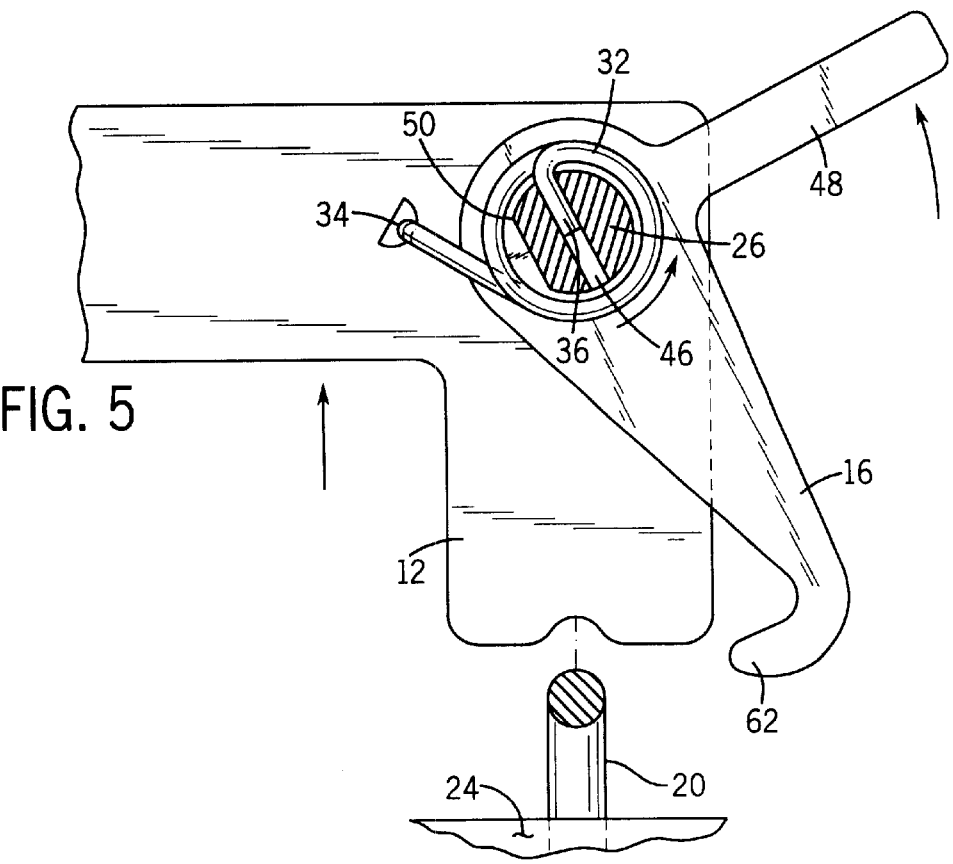
FIG. 5 is a cross sectional view of the release mechanism in the activated position, taken generally along lines 4—4 of FIG. 1.

As shown in FIGS. 1, 4 and 5 first release 16 includes a lever handle 48 extending in a frontward direction away from the first base plate 12 in a plane parallel to the plane of the first base plate 12. Release 16 further includes an aperture 50 through which first stud 26 extends. The aperture 50 is "D" shaped to receive the "D" shaped first stud 26. An exterior surface 52 of bearing journal 50 is in contact with a portion of spring 32. Release 16, 18 also includes a hook portion 62, 64 releasably engaging latch 20, 22 respectively. First release 16 is positively located with respect to first stud 26.

Referring to FIG. 2, second stud 28 includes a first end 54 extending through an aperture in the second base plate 14 and a second end 56 located within a second end 58 of cross tube 30. Second stud 28 may be formed as a unitary part of part of the cross tube 30 or may be a separate component that is either press fit within the opening of the cross tube 30 or may be further fit within the cross tube 30 with a clearance fit. Second release 18 includes a bearing 60 having a "D" shaped opening through which the "D" shaped second stud 28 extends. Second release 18 includes a hook portion 64 releasably engaging the latch 22. Second release 18 is positively located with respect to second stud 28.

The assembly of the release mechanism 10 will now be described. To aid in the description of the assembly, the release mechanism will be described as a drivers seat mechanism, such that the first base plate 12 will be referred to as the left or drivers side of the release mechanism and the second base plate 14 will be referred to as the right or passenger side of the release mechanism. Of course the release mechanism may be used on a passenger seat such that the lever 48 is located on the right or passenger side for convenience. The front direction will be defined by the direction that the lever 48 points in FIG. 1.

The first and second base plates 12, 14 are secured to the seat frame or are integral with the seat frame. Torsion spring 32 is placed over first stud 26 with the first leg or end 36 located within slot 46 of the first stud. The first end 38 of first stud 26 is passed through the D shaped opening in release 16, and through the opening in plate 12. The first end 44 of cross tube 30 is then slid on to the beveled portion 42 of first stud 26. The cross tube 30 is pressed toward plate 12 thereby compressing torsion spring 32, until there is sufficient clearance to insert second stud 28 through release 18 and plate 14. After the second stud 28 has been positioned, the cross tube 30 is permitted to receive the beveled portion 57 of second stud 28. The torsion spring 32 will then exert a force against end 44 of cross tube 30 until second end 58 of cross tube 30 is flush against the base portion of the stud 28. Alternatively, the second end 58 of cross tube 30 may be pressed against another member such as release 18. Finally, second end or leg 34 of torsion spring 32 is attached to an opening in plate 12.

The operation of the release mechanism will now be described. FIGS. 1–4 illustrate the release mechanism in the engaged position with hook portions 62, 64 engaged with latches 20, 22.

Rotation of release 16 is caused by an upward movement of handle 48 as illustrated in FIG. 5. Since aperture 50 of release 16 is "D" shaped, the first stud 16 which is also "D" shaped is also rotated about its axis. Rotation of the first stud 16 will be translated to rotation of cross tube 30 which in turn will rotate release 18. The rotation of releases 16, 18 disengages hook portions 62, 64 from latches 20, 22.

Rotation of release 16 will cause torsion spring 32 to tighten about first stud 26, such that upon release of handle 48 by a user, the release 16, cross tube 30 and second release 18 will be biased back to the engaged position. During both the engaged position in which both release 16 and 18 are engaged with latches 20, 22 respectively, and the non-engaged position illustrated in FIG. 5, the torsion spring 32 exerts a rotational force to first plug 26 and a translational force along the cross car axis extending from left to right biasing cross tube 30 toward second plate 24. In this manner rattle and noise is substantially eliminated by the compressive nature of the torsion spring 32.

The compressive element of the spring should provide a force greater than the frictional force created by the coils as the torsion spring is wound about the stud. In this manner the friction opposing linear movement of the spring in the cross car direction will not prevent the spring from biasing the cross tube against the second release mechanism.

While the detailed drawings, specific examples and particular formulations given describe exemplary embodiments, they serve the purpose of illustration only. The systems shown and described are not limited to the precise details and conditions disclosed. For example, the system described is applied to a latch release mechanism to release the seat from a latch on the floor of the vehicle, however the release mechanism may also be employed in a seat reclining mechanism or any other dual release mechanism in which rotational movement is translated from a first and second release mechanism in which a translational force is also required. In the preferred embodiment the translational force is in the axial direction of the cross member. Additionally, the torsion spring may have additional configurations that provide both a rotational and linear force to the cross bar. The spring may also be attached to the cross bar in various ways such as internally within the cross bar. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for an automotive seat release mechanism, comprising:
   a first release located on a first side of a seat assembly, and a second release located on a second side of the seat assembly;
   a cross member operatively connecting the first release and the second release;
   a spring applying a rotational force to the cross member about a longitudinal axis of the cross member in a first direction and continuously applying a compressive linear force along the longitudinal axis of the cross member.

2. The apparatus of claim 1, wherein the first release includes an activator operatively coupled to the cross member, the activator being movable from a first position to a second position, the activator rotating the cross member in a second direction opposite the first direction when being moved from the first position to the second position.

3. The apparatus of claim 2, wherein a first end of the spring is operatively connected to the cross member and movable about the longitudinal axis of the cross member with rotation of the cross member, the cross member being rotatable relative to a support, a second end of the spring being operatively connected to the support.

4. The apparatus of claim 3, wherein the spring includes a plurality of coils intermediate the first and second ends of the spring, a portion of at least one coil of the spring operatively biasing the cross member toward the second release.

5. The apparatus of claim 4, wherein the support includes a bearing receiving a first portion of the cross member, and a second bearing including a second portion of the cross member.

6. The apparatus of claim 5, wherein the cross member includes a tube having a keyed opening receiving a first plug matching the keyed opening of the tube.

7. The apparatus of claim 6, wherein the first plug is received within the first bearing.

8. The apparatus of claim 7, wherein the cross member includes a second plug being received within a second opening in the tube, the second plug being received within the second bearing.

9. The apparatus of claim 8, wherein first end of the spring is connected in a slot in the first plug.

10. The apparatus of claim 9, wherein the portion of at least one coil is in contact with a first end of the tube.

11. The apparatus of claim 10, wherein the coils are wrapped around a portion of the cross member, the coils imparting a frictional force to the cross tube opposing movement in the cross seat direction along a longitudinal axis of the cross tube, the linear force of the spring being greater than the frictional force.

12. A method for connecting a pair of release mechanisms for a seat assembly comprising:
   providing a seat assembly having a first release on a first side of the seat assembly and a second release on a second side of the seat assembly;
   operatively connecting the first release and second release with a cross member;
   coupling a spring to the cross member, the spring providing a rotational force to the cross member about a longitudinal axis of the cross member and continuously providing a compressive linear force to the cross member biasing the cross member away from the first release toward the second release.

13. The method of claim 12, wherein, the step of operatively connecting the first release and second release with a cross member includes attaching a first end of a tube to a first connector and attaching a second end of the tube to a second connector, the tube being free to move along its longitudinal axis between the first and second release.

14. The method of claim 13, wherein the step of coupling the spring to the cross member includes providing a spring having a plurality of coils extending about the cross member and placing the spring under compression biasing the tube toward the second release.

15. The method of claim 14, wherein the step of coupling the spring to the cross member includes providing a rotational force to the cross member to bias the tube about the longitudinal axis in a first direction.

16. The method of claim 15, wherein the step of coupling the spring to the cross member includes providing a linear force to the tube that is greater than a frictional force imparted by the coils of the spring to a surface of the cross member opposing linear motion of the tube along the longitudinal axis of the cross member.

17. An anti-rattle mechanism for an automotive seat release including:
    a first release and a second release configured to be located on opposite sides of the seat;
    a cross member operatively coupled to the cross member applying a rotational force in a first direction about a longitudinal axis of the cross member, and continuously applying a compressive liner force parallel to the longitudinal axis of the cross member.

18. The anti-rattle mechanism of claim 17, wherein the cross member is movable along the longitudinal axis between the first and second release, the spring biasing the cross member toward the second release.

19. The anti-rattle mechanism of claim 18, wherein the cross member rotates between an engaged position to a second position when the releases are disengaged, the rotational force of the spring being applied to the cross member to bias the first and second release to the engaged position.

20. The anti-rattle mechanism of claim 19, wherein the spring includes a plurality of coils wrapped about the longitudinal axis of the cross member.

* * * * *

UNITED STATES PATENT AND TRADEMARK OFFICE
CERTIFICATE OF CORRECTION

PATENT NO. : 6,644,744 B2  Page 1 of 1
DATED : November 11, 2003
INVENTOR(S) : Kurt Seibold It is certified that error appears in the above-identified patent and that said Letters Patent is hereby corrected as shown below:

Column 6,
Line 5, please insert after "operatively" -- coupling the first release and the second release; and
    a torsion spring operatively --.

Signed and Sealed this

Sixth Day of April, 2004

JON W. DUDAS
*Acting Director of the United States Patent and Trademark Office*